(12) United States Patent
Schoeberl

(10) Patent No.: US 9,129,542 B2
(45) Date of Patent: Sep. 8, 2015

(54) SYSTEM AND METHOD FOR GENERATING AND DISPLAYING CLIMATE SYSTEM MODELS

(75) Inventor: Barbara Schoeberl, Silver Spring, MD (US)

(73) Assignee: ANIMATED EARTH, LLC, Silver Spring, MD (US)

( * ) Notice: Subject to any disclaimer, the term of this patent is extended or adjusted under 35 U.S.C. 154(b) by 550 days.

(21) Appl. No.: 13/410,603

(22) Filed: Mar. 2, 2012

(65) Prior Publication Data

US 2013/0057580 A1    Mar. 7, 2013

Related U.S. Application Data

(60) Provisional application No. 61/448,498, filed on Mar. 2, 2011.

(51) Int. Cl.
*G09G 5/00* (2006.01)

(52) U.S. Cl.
CPC ........................................ *G09G 5/00* (2013.01)

(58) Field of Classification Search
None
See application file for complete search history.

(56) References Cited

U.S. PATENT DOCUMENTS

| | | | |
|---|---|---|---|
| 6,229,546 B1 | 5/2001 | Lancaster et al. |
| 7,239,311 B2 | 7/2007 | Dunn et al. |
| 7,751,949 B2 | 7/2010 | Alanen et al. |
| 2009/0125488 A1* | 5/2009 | Vala ................................ 707/3 |
| 2010/0161295 A1 | 6/2010 | Heil et al. |
| 2010/0217739 A1 | 8/2010 | Vajjhala |

OTHER PUBLICATIONS

Jones et al. "The MapPlace—An Internet-based Mineral Exploration Tool", available online since 2002 and also appear in B.C. Ministry of Energy and Mines, Geological Field work 2001, Paper 2002-1(2002) pp. 409-420.*
Coral Reefs, "Lithosphere", available online since Mar. 8, 2004.*
Haefiner et al. "Track and explore real-time earthquakes and volcanic activity" posted online since Aug. 27, 2007 @ http://google-latlong.blogspot.com/2007/08/posted-by-scott-haefner-and-dina.html.*
Google Earth Outreach Training, Workbook for Indigenous Mapping Workshop 2010.*
Kundig, "Technical Note TN #90" GeoSIG Ltd. Feb. 2003.*
Khoi, "New features of IDRISI Taiga 2009", available since Sep. 3, 2009.*
"IDRISI Taiga", downloaded @http://web.archive.org/web/20101125195852/http://www.clarklabs.org/products/idrisi-taiga.cfm, available online since Nov. 25, 2010.*

(Continued)

*Primary Examiner* — Yingchun He
(74) *Attorney, Agent, or Firm* — Banner & Witcoff, Ltd.

(57) ABSTRACT

An embodiment of the invention provides a system and method for generating and displaying climate system models. A data collector automatically extracts global earth data from multiple data sources, wherein the global earth data includes image data and/or text data. The global earth data includes atmospheric data, hydrospheric data, lithospheric data, cryospheric data, biospheric data, and/or anthrospheric data. A processor connected to the data collector generates global images based on the extracted global earth data, wherein the global images display the global earth data on a map. A display connected to the processor displays at least one second global image on a first global image. The first global image includes first global earth data for a select geographic area; and, the second global image includes second global earth data for the select geographic area.

19 Claims, 8 Drawing Sheets

(56) References Cited

OTHER PUBLICATIONS

"Earth Trends Modeler", downloaded @http://web.archive.org/web/20101211053103/http://clarklabs.org/products/Earth-Trends-Modeler.cfm, available online since Dec. 11, 2010.*

"Land Change Modeler Product Feature", downloaded @http://web.archive.org/web/20101121021236/http://clarklabs.org/products/Land-Change-Modeler-Product-Features.cfm available online since Nov. 12, 2010.*

EdGCM, Quick Start Guid, http://edgcm.columbia.edu, Version 3.2, 2003-2009.

* cited by examiner

| Land vegetation & solid earth | Air/Atmospheric | Greenhouse & trace gases | Water & ice | Life | State |
|---|---|---|---|---|---|
| land vegetation index (NDVI) | clouds | Carbon Dioxide CO2 | rainfall | Ocean Chlorophyl Concentration | night lights |
|  | water vapor |  |  |  |  |
|  | Carbon monoxide |  |  |  |  |
| fires | Aerosol Index (UV) | water vapor | sea surface temperature | land vegetation index (NDVI) | country and state boundaries |
|  | Aerosol (Optical Depth) | methane |  |  |  |
|  |  | Column Ozone |  |  |  |
|  |  | Tropospheric Ozone |  |  |  |
| soil moisture | Tropospheric Ozone | sulfur dioxide (SO2) surface or boundary layer | sst anomally | night lights | ocean circulation |
|  | Column Ozone |  |  |  |  |
| Earthquakes | tropopause height | sulfur dioxide SO2 volcanic or mid- troposphere | soil moisture | population | plate tectonics |
| volcanoes | wind vectors (1,000, 850, 500, 300, 30 hPa) | nitrogen dioxide NO2 | snow & ice cover | infant mortality | Hadley circulation |
|  | wind intensity |  | snow equiv.water |  |  |
|  | lightning | Formaldehyde HCOH | sea ice | fires | animal migrations |
|  | surface air temp. |  | Chlorophyl concentration |  |  |

SYSTEM AND METHOD FOR GENERATING AND DISPLAYING CLIMATE SYSTEM MODELS

CROSS-REFERENCE TO RELATED APPLICATIONS

This application claims the benefit of U.S. Provisional Patent Application Ser. No. 61/448,498 filed Mar. 2, 2011, incorporated herein by reference.

BACKGROUND

The present invention is in the field of systems, methods, and computer program products for generating and displaying climate system models.

Much can be learned about the health of the earth by studying the dynamic interdependent relationships between the atmosphere (air), hydrosphere (water), geosphere or lithosphere (land), cryosphere (ice), and biosphere (life), collectively referred to as the five elemental spheres. Comparing and contrasting earth-observing satellite data from different sources deepens researchers' understanding of earth systems and the interdependency between different natural forces.

Until recently, the components comprising the five elemental spheres have been studied independently as their own respective disciplines. Now, the earth is being studied as a whole in order to understand the complex interrelationships and interdependencies of the different natural and anthropogenic forces.

SUMMARY OF THE INVENTION

An embodiment of the invention provides a system and method for generating and displaying climate system models. More specifically, a data collector automatically extracts global earth data from multiple data sources, wherein the global earth data includes data in at least three different formats. The global earth data includes image data and/or text data, and includes atmospheric data, hydrospheric data, lithospheric data, cryospheric data, biospheric data, and/or anthrospheric data.

A processor connected to the data collector reprocesses the global earth data into a first format or a second format. The processor generates global images based on the extracted global earth data, wherein the global images display the global earth data on a map. A display connected to the processor displays at least one second global image on a first global image. The first global image includes first global earth data for a select geographic area; and, the second global image includes second global earth data for the select geographic area.

It is an object of the invention to provide a system and method that automatically extracts near-real time global earth data from multiple independent data sources at predetermined time intervals without human interaction.

It is another object of the invention to provide a system and method that generates images based on the extracted global earth data, wherein the images display the global earth data on a map (e.g., precipitation over the state of Florida).

It is still another object of the invention to provide a system and method that displays two or more user-selected types of global earth data (e.g., rainfall and land elevation) on the same map in near-real time.

It is yet another object of the invention to provide a system and method that compares and contrasts global data representing all five elemental different sources to deepen understanding of earth systems and the interdependency between different natural forces.

It is still yet another object of the invention to provide a system and method that facilitates observation of relationships between divergent sets of earth-observing data from the five elemental spheres by collecting near-real time data that can be displayed on a rotating globe and animated by the end-user in real time.

It is another object of the invention to provide a tool that can be used in both formal and informal educational settings to improve the study of earth science.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 2 is a table illustrating global earth-observing data sets from five elemental spheres and the anthrosphere according to an embodiment of the invention;

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides a system that displays near-real-time images (e.g., within 24 hours of measurement) of global earth observing data sets from five elemental spheres, namely, the atmosphere, hydrosphere, geosphere or lithosphere, cryosphere, and biosphere. When visually compared, an end-user can identify relationships between such data sets. End-users can also compare current data sets with historical data. Additionally, sociological data sets can be added which represent the anthrosphere, or structures and systems constructed or modified through human activity.

Figure 1:
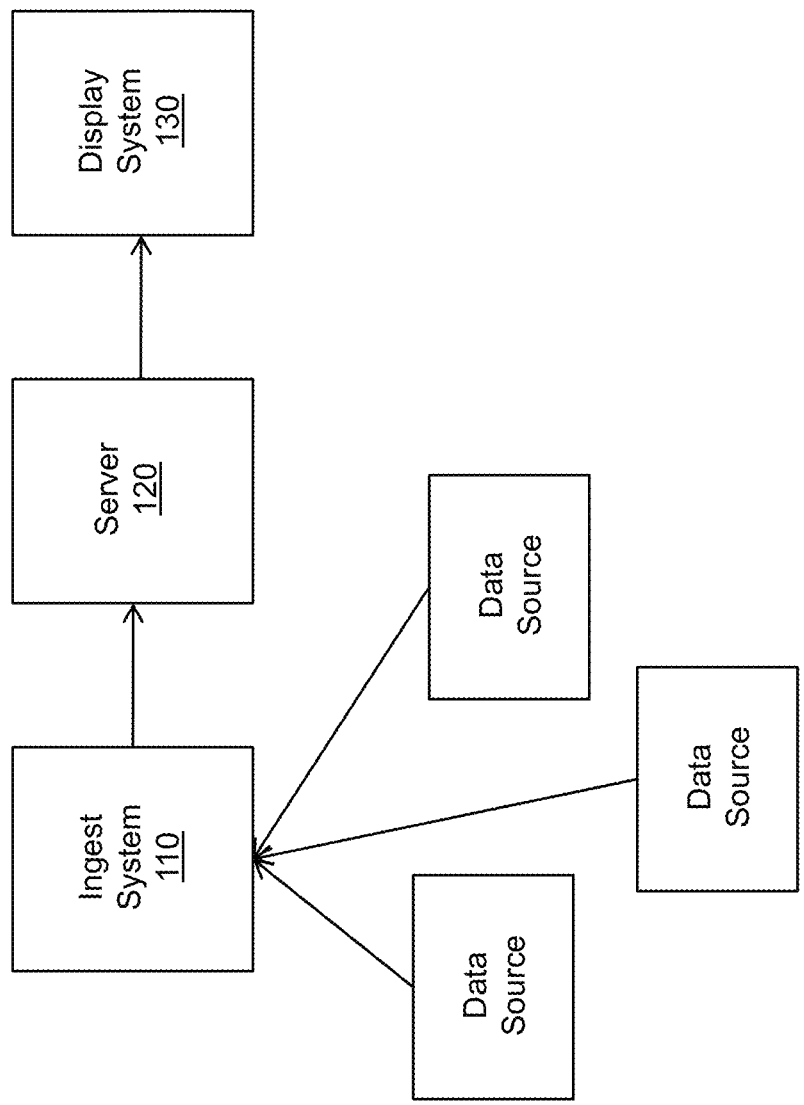
FIG. 1 illustrating a system according to an embodiment of the invention.

FIG. 1 illustrates a system 100 according to an embodiment of the invention. The system 100 includes an ingest system 110, an earth today server 120, and a display system 130. The ingest system 110 automatically ingests/retrieves data from various sources and unpacks the data from its native format. The second part, the earth today server 120, processes the ingested and unpacked data into image files, re-processes the data files into common easy to use formats, archives the images and data, and prepares the images and data for distribution to end-users. The third part, the display system 130, is an update and display software package that resides on an end-user's computer. The display system 130 allows the end-user to receive the most recent updates from the server, and provides an intuitive graphical user interface (GUI) that allows the end-user to view and manipulate the data sets, which reside on the end-user's computer.

The ingest system 110 can acquire global earth-observing satellite data sets from public archives where scientific data is posted daily—sometimes multiple times a day. Exemplary data sets representing the five elemental spheres include, but are not limited to, atmospheric data (air—meteorological, trace gas, aerosol, etc.), biospheric data (life—on land and in the sea), hydrospheric data (water—ocean temperatures, chlorophyll), lithospheric data (land—earthquakes and volcanoes, soil moisture, rainfall), cryospheric data (ice—snow and ice covering both land and sea) and anthrosphere (human—population, energy use, fires, birth/death rates). Much of the data may be acquired from governmental sources such as, for example, National Aeronautics and Space Administration (NASA) and National Oceanic and Atmospheric Administration (NOAA) satellites and by United States Geological Survey (USGS) observatories. FIG. 2 is a table illustrating exemplary global earth observing data sets from the five elemental spheres and the anthrosphere.

In at least one embodiment of the invention, the ingest system 110 logs onto a series of File Transfer Protocol (FTP) or Hypertext Transfer Protocol (HTTP) sites and checks if new data has been posted. If there is new data, the data is transferred to the system ingest computer. Specifically, the ingest system 110 can include software having a series of standalone routines for each data product, wherein each code has the following generic structure: using system date-time we form the access file name and use WGET to access remote servers and locate the most updated file. This file is transferred to the local computer (e.g., via FTP). Files of interest are imbedded in various format files that are often difficult to access and interpret. Each data set is treated slightly differently based on the processes governing the data. The system also includes special codes to reprocess data or extend the data range. These formats include, but are not limited to, HDF5, HDFEOS, NetCDF, or GRIB. The codes extract the data from these files. For example, Google Earth files (in Keyhole Markup Language (KML)) are downloaded where data is extracted from these files.

Once the data of interest is extracted and unpacked, it is processed through a program to prepare each data set to be compatible in size, shape, and time sequencing so it can be compared with every other data set in the system. The data fields may be further processed to create more usable data. For example, very high resolution data may be re-gridded to lower resolution by averaging data within larger grid boxes. Data flags and data statistics can be used to reject bad data. If there is missing data due to incomplete coverage, data from the previous day may be used to fill in gaps as appropriate. Fourier filters and box car smoothing algorithms may be applied to noisy data to reduce noise.

Once the data processing is complete, an image generation module (also referred to herein as the "processor") generates an image of the data. The image generation module automatically creates an image for the display system 130 (e.g., 512× 1024 or a higher resolution 1024×2048 .png image file) and/or a Google earth KML file, which includes a color bar and legend. In at least one embodiment, the image of the data is produced on a cylindrical map projection for creating a global map. The image generation module archives the data, image, and/or KML file, for example, as NetCDF or interface description language (IDL) .sav files.

In at least one embodiment of the invention, each data set that is processed by the ingest system 110 has a unique data generation program (UDGP). That is, there is a separate and unique code for processing each data set. For instance, lightning data has its own separate code; chlorophyll has its own separate code, etc. Underlying these separate codes is the image generating software, date/time management software, etc. Some UDGP's produce multiple useful data sets. For example the sea surface temperature (SST) software produces SST's, SST anomalies, and coral reef stress. The ingest system 110 is configured so that it can run each UDGP at a different time of the day (e.g., using CRON jobs) to provide minimum stress on network bandwidth and processing resources. Some UDGP's can run multiple times a day to provide more frequent updates. One embodiment of the invention includes over 30 UDGP's written in IDL with over 50 specialized supporting routines.

In at least one embodiment, the server 120 manages the automatic logins and contains the archive folders for the data and images. The server 120 can bring updated images over from the ingest system 110 and from other sources as appropriate, and can provide the images to the display system 130. In one embodiment, the server 120 software is UNIX-based C++ custom coded script. The server 120 can perform updates several times a day and can move images that it ingests into special folders. When the display system 130 updates the archive, it can log onto the server 120 and bring over the most recent data from the folders. In one embodiment of the invention, the server 120 only stores image data and has approximately half of the memory capacity at the ingest system 110.

The display system 130 runs on a client computing device such as an appropriately configured laptop or desktop, a kiosk, or a cloud system or similar device. In at least one embodiment, the display system 130 includes update software, which, when it is run, logs onto the server 120, compares the archive on the end-user's computer with the server 120 archive, and brings the end-user's archive up to date.

At least one embodiment of the invention uses touch screen controls, where the end-user selects the data sets of interest and the date ranges for those data sets. The appropriate images are located within the archive on the end-user's machine and a data movie is created "on the fly" by rapidly displaying the images in a sequence. The movie is shown on the image of a rotating earth globe that can be zoomed in or out and rotated to be viewed from any perspective and the speed of the movie can be varied. The touch screen controls allow image control and data selection. The system overlays two data sets, varying the transparency so that the two data sets can be seen at once—for example, clouds and precipitation.

The system is an effective tool in both formal and informal educational settings. It can be used by academic and research scientists in the course of their work to discuss science with their peers and investigate inter-relationships between data. Moreover, the system can be used as a browse tool to quickly scan through massive amounts of data, and to explain science to students and the public.

Figure 3:
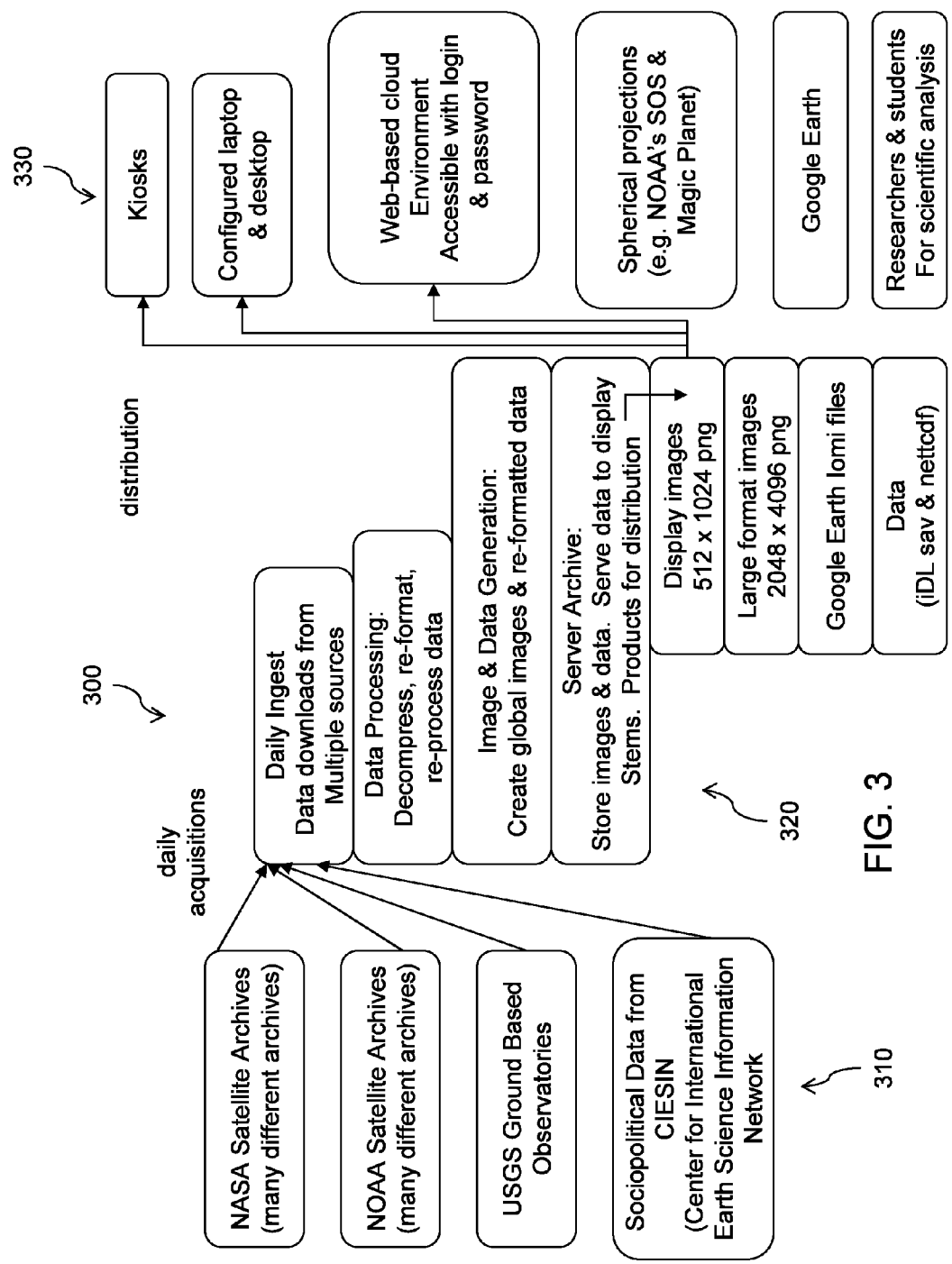
FIG. 3 illustrating a system according to another embodiment of the invention.

FIG. 3 illustrates a system 300 according to another embodiment of the invention, wherein the system 300 includes data archive sources 310, an ingest and processing module 320, and displays 330. The data archive sources 310 include data from NASA satellite archives, NOAA satellite archives, USGS ground based observatories, and sociopolitical data from the Center for International Earth Science Information Network. The ingest and processing module 320 is connected to data archive sources 310, and includes a daily ingest module, a data processing module, an image and data generation module, and a server archive module. As used herein, the term "connected" includes operationally connected, logically connected, in communication with, physically connected, engaged, coupled, contacts, linked, affixed, and attached. In at least one embodiment, each of the modules in the ingest and processing module 320 are on the same machine. The displays 330 include kiosks, laptop and desktop computers, a web-based cloud environment, spherical projections, Google™ Earth, and displays for researchers and students.

Figure 4:
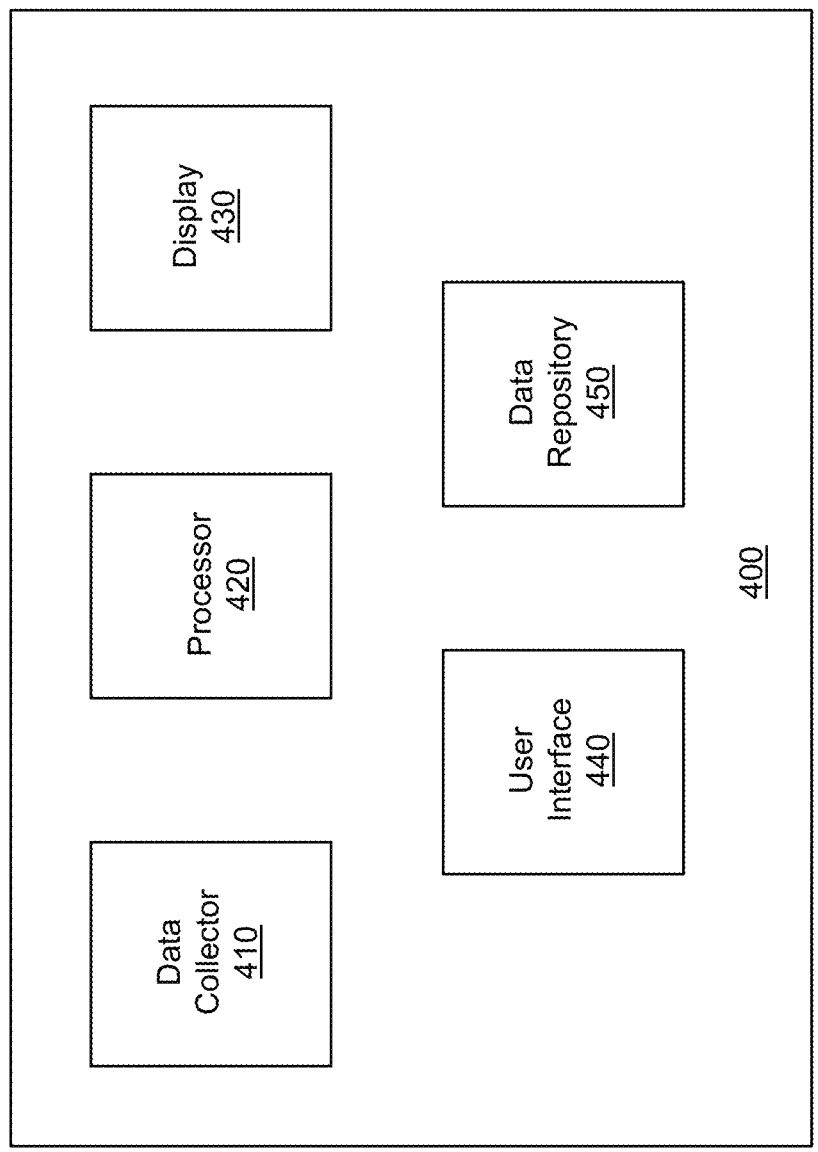
FIG. 4 illustrates a system generating and displaying climate system models according to an embodiment of the invention.
Figure 5:
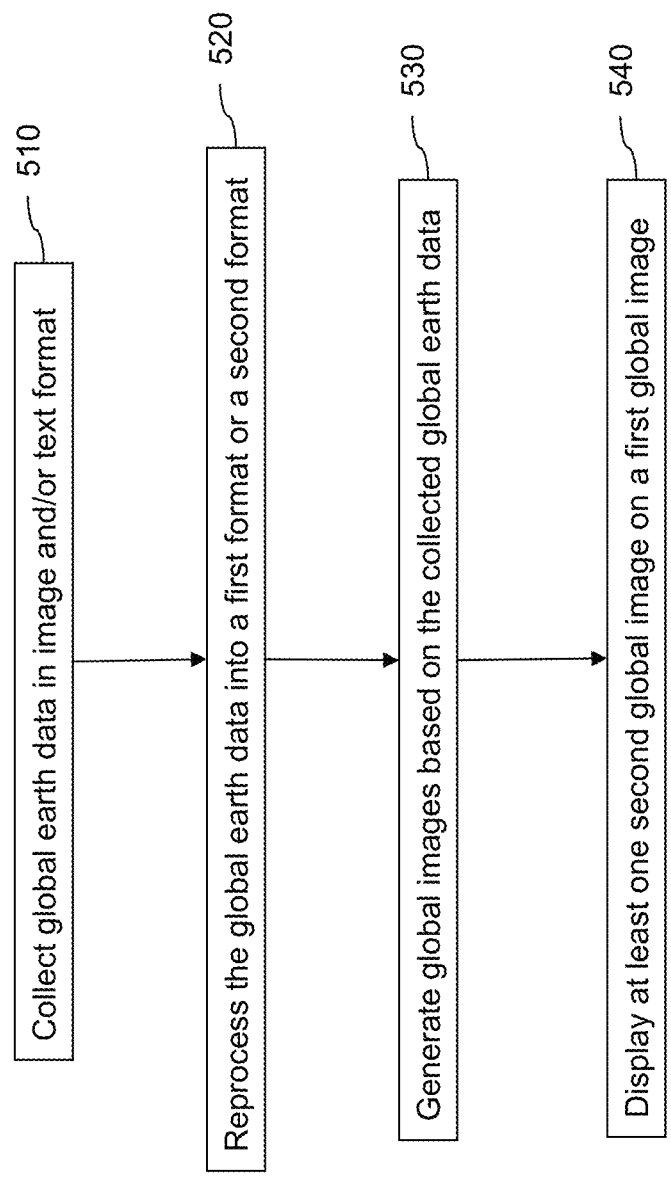
FIG. 5 is a flow diagram illustrating a method for generating and displaying climate system models according to an embodiment of the invention.

FIG. 4 illustrates a system 400 for generating and displaying climate system models according to an embodiment of the invention. The system includes a data collector 410, processor 420, display 430, user interface 440 and data repository 450. In at least one embodiment, the data collector 410, processor 420, display 430, user interface 440 and/or data repository 450 reside on the same machine. FIG. 5 is a flow diagram illustrating a method for generating and displaying climate system models according to an embodiment of the invention, for example, using the system 400.

The data collector 410 (also referred to herein as the "ingest system") collects global earth data in image and/or text format 510. In at least one embodiment, the global earth data includes both image data and text data. The global earth data includes atmospheric data (e.g., meteorological data, trace gas data, and aerosol data), hydrospheric data (e.g., ocean temperature data, chlorophyll data, current data), lithospheric data (e.g., seismic data, volcano data, soil moisture data, rainfall data, plate boundary data), cryospheric data (e.g., snow data and ice data), and/or anthrospheric data (e.g., human population data, energy use data, fire data, birth data, death data).

In at least one embodiment of the invention, the data collector 410 automatically extracts global earth data from multiple data sources at predefined time intervals. For example, the data collector 410 can be programmed to extract global earth data from NOAA's website every 60 minutes. In another example, the data collector 410 is programmed to extract global earth data from NASA's website every Monday morning at 7:00 AM). Once the data collector 410 is programmed, it can automatically extract global earth data without human interaction.

The data collector 410 is connected to the processor 420 (also referred to herein as the "earth today server"). In at least one embodiment of the invention, the data collector 410 and the processor 420 reside on the same machine. In at least one embodiment, the global earth data includes data in at least three different formats, wherein the processor 420 reprocesses (i.e., converts) the global earth data into a first format or a second format 520. As described above, the ingest system extracts data stored in a variety of formats from separate and independent sources/archives. The data is unpacked and processed (i.e., cleaned up, decompressed, reformatted into common easy to use formats).

The processor 420 generates global images based on the collected global earth data 530, wherein the global images display the global earth data on a map. For example, a global image is generated that displays average air temperature over a map of the Washington, D.C. metropolitan area for a select time period (e.g., past 30 days). In another example, a global image is generated that displays precipitation over a map of the state of California for another select time period (e.g., past 24 hours).

The processor 420 is connected to the display 430, wherein the display 430 displays at least one second global image on a first global image 540. More specifically, the first global image includes first global earth data (e.g., wind speeds) for a select geographic area (e.g., the 22313 zip code); and, the second global image includes second global earth data different from the first global earth data (e.g., clouds) for the select geographic area. The second global image is superimposed on the first global image, wherein the transparency of the first global image and/or second global image can be adjusted via the user interface 440. In at least one embodiment of the invention, the first global image includes an animated sequence of global images of the first global earth data for the select geographic area; and, the second global image includes an animated sequence of global images of the second global earth data for the select geographic area. For example, the first global image includes an animated sequence of global images showing the movement of precipitation over a period of 2 hours.

The global earth data and/or global images are stored in the data repository 450 (also referred to herein as the "electronic historical archive"). In at least one embodiment, the displayed first and second global images are retrieved from the data repository 450.

Figure 6A:
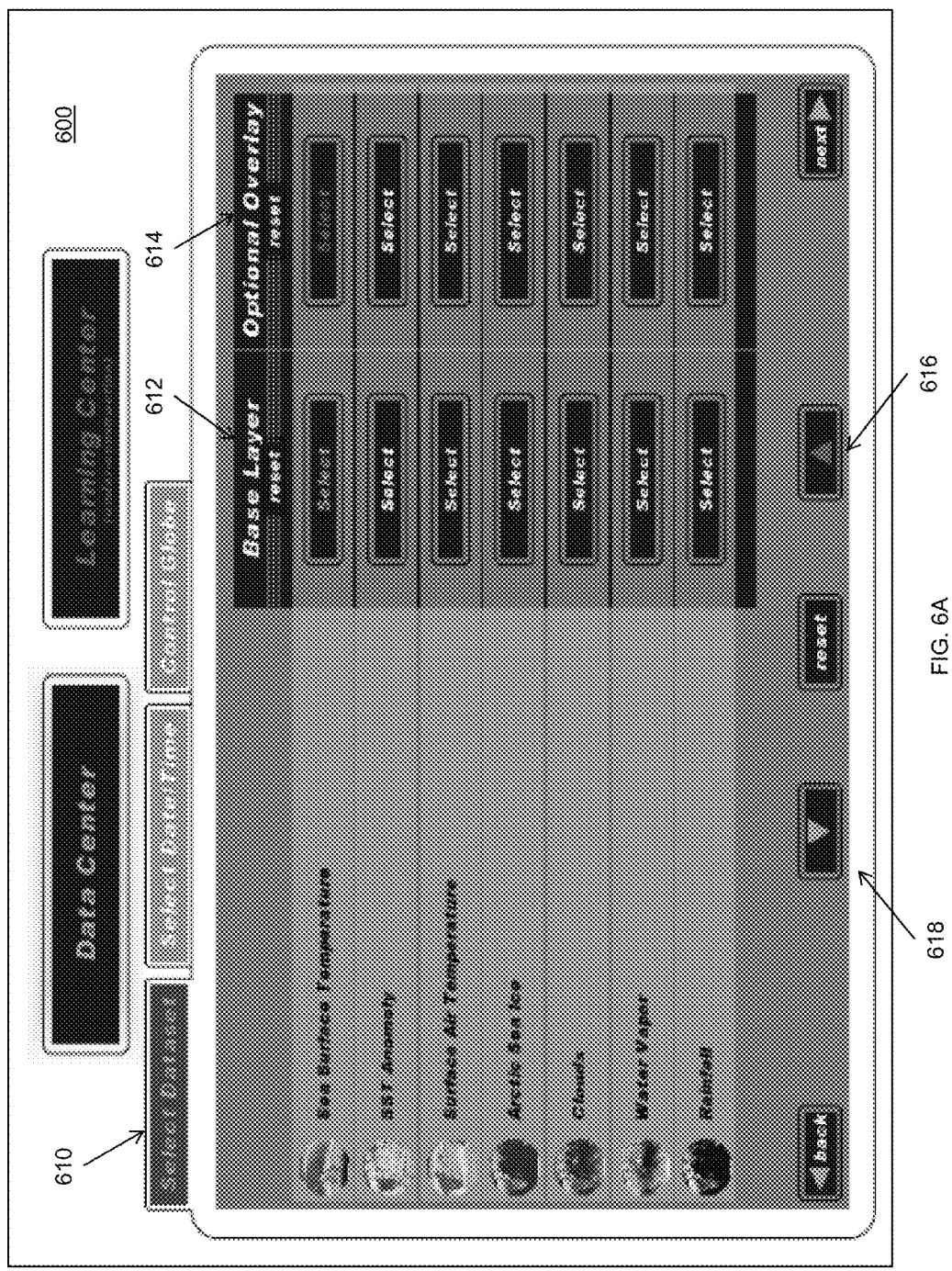
FIGS. 6A, 6B and 6C illustrate an interface according to an embodiment of the invention.
Figure 6B:
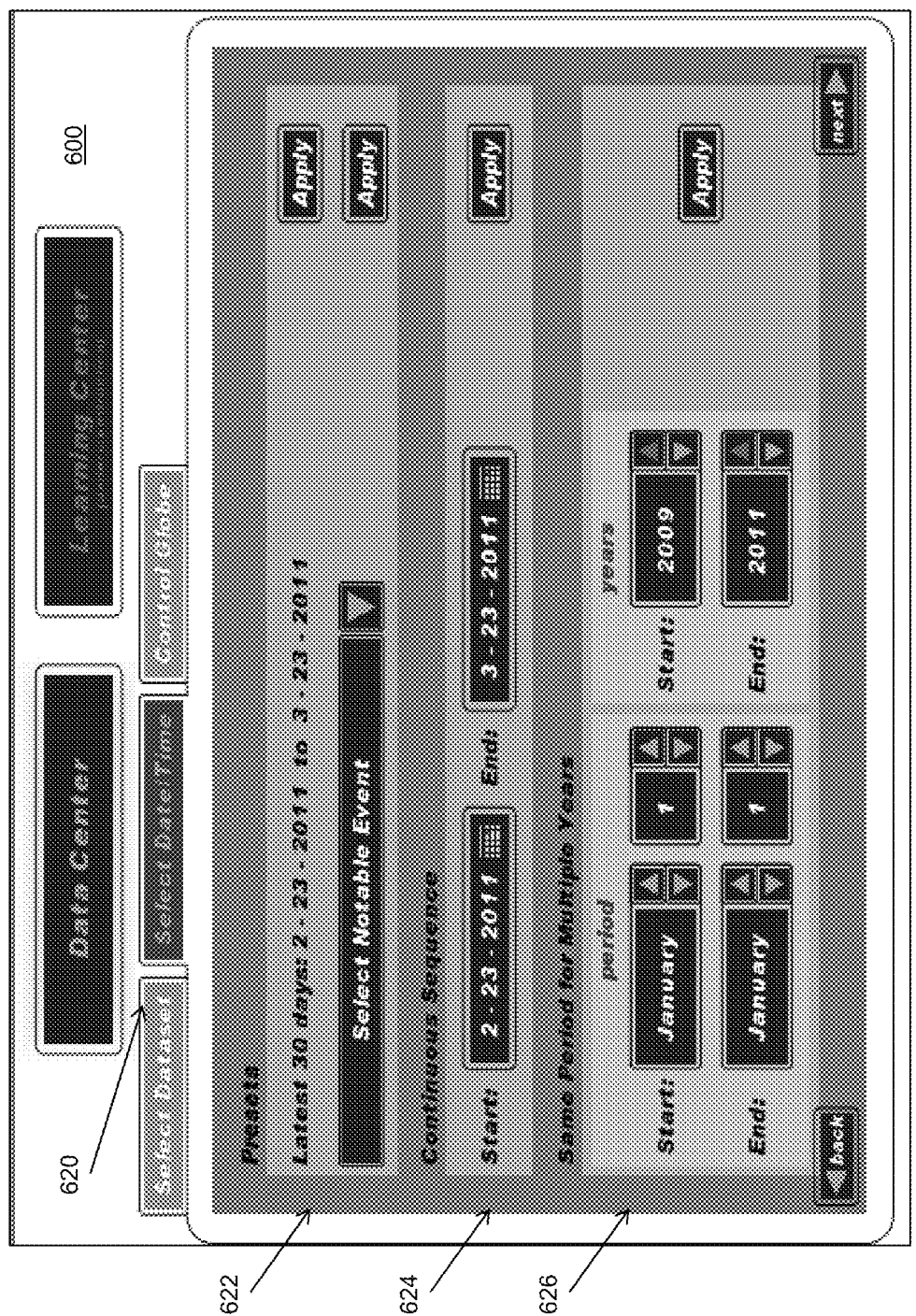
Figure 6C:
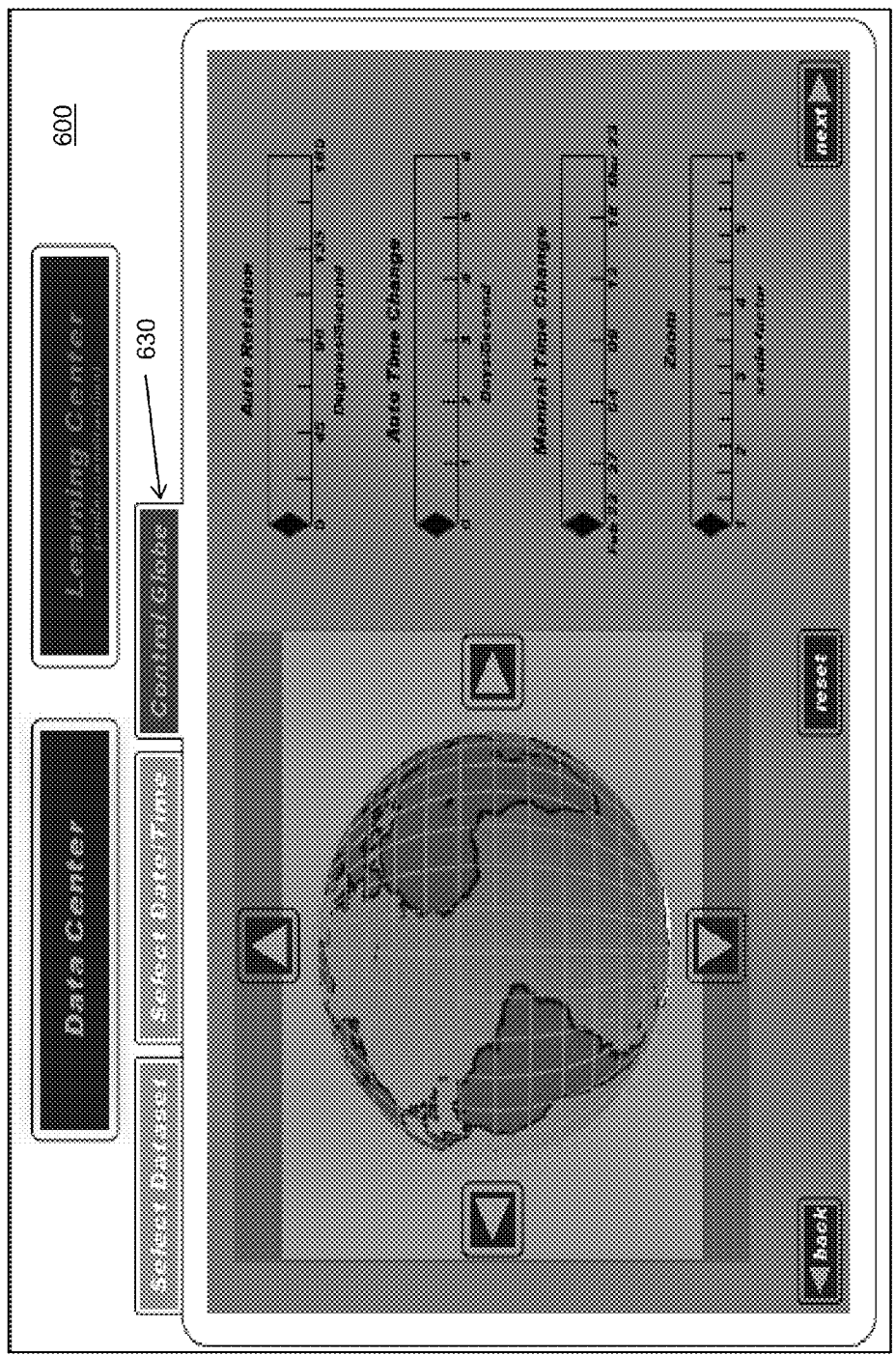

FIGS. 6A, 6B and 6C illustrate a graphical user interface 600 according to an embodiment of the invention, having a first panel 610, a second panel 620 and a third panel 630. The first panel 610 (the "Select Dataset" panel) allows the end-user to select a data set for the base layer 612 and the option of selecting a second overlay layer 614. The overlay has a sliding bar for adjusting the transparency of that layer. The up/down arrows 616 and 618 at the bottom of the page allow end-users to scroll up or down the growing list of data sets.

The second panel 620 (the "Select Date/Time" panel) allows the end-user to select the desired time-range. In the top section 622, called "Presets", the default option is the "Latest 30 days". The next option, "Select Notable Event", has a drop down menu of events the end-user is likely to be familiar with, such as, for example, Hurricane Katrina or the Japanese earthquake. The middle section 624 allows the end-user to custom-select a specific data range by using a drop-down calendar that allows them to select month, day, and year for the starting point and ending point of their selection. The bottom section 626 allows the end-user to select a time range over multiple years to compare the differences from one year to the next. This is useful when comparing, for example, the ozone hole from one year to the next, or the decline of arctic sea ice, or the El Niño/La Niña ENSO cycle in the Pacific.

The third panel 630 (the "Control Globe" panel) allows the end-user to control whether or not the earth rotates, or how fast it rotates. The orientation of the globe can also be altered. The end-user can also determine if and how rapidly the data advances, and can zoom closer in on a region-of-interest.

In at least one embodiment of the invention, source files containing global earth observing satellite data and ground-based observations are acquired in their native and diverse data formats on a regular basis from numerous public archive sources. These divergent data types are decompressed and reprocessed to generate images that can be compared visually and through time. The data may be imaged in 512×1024 .png images and 2048×4096 .png and saved as KML files. The data can be preserved in at least two common formats, e.g., netCDF and idl raw. Global earth observing satellite and ground-based images representing the five elemental spheres, (hydrosphere/water, lithosphere/land, atmosphere/air, cryosphere/ice, and biosphere/life) with added data from the anthrosphere/human are then displayed on client computing devices such as kiosks, configured laptop and desktop computers, hand held devices and through a cloud computing network system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method comprising:
   electronically receiving computer readable global earth datasets in a native format at regular daily intervals from multiple data sources accessed through secure protocols over the web, the global earth datasets including computer readable data representative of each of earth science observed data including atmospheric data, hydrospheric data, lithospheric data, cryospheric data, biospheric data, and anthrospheric data;
   electronically processing the global earth datasets based on different computer readable identifiers for the datasets;
   electronically generating digital global earth images with a computer processor, by executing computer readable code to process each individual global dataset, the global images being generated based on the received global earth datasets in their native format and converted, by executing computer readable code, into the global images for digital display and access by way of a graphical user interface; and
   displaying the graphical user interface on a computing device display screen and displaying a computer generated global map thereon; the graphical user interface having first, second, and third user selectable panels;
   the first user selectable panel being configured to display a first user selectable global image associated with a first global earth image representative of a first global earth dataset, and a second user selectable global image associated with a second global earth image representative of a second global earth dataset, the first user selectable panel being further configured to enable a user to select for superimposing the second global earth image over the first global earth image;
   the second user selectable panel being configured to enable a user to select a date range from a period of time associated with the datasets;
   the third user selectable panel being configured to display the computer generated global map including a plurality of graphical tools for manipulating a size and rotation of the global map and display animated movement of the data on the global map; wherein responsive to the selection of the first, second or third user selectable panel of the graphical user interface, a user selectable tab portion of the two unselected panels are displayed above the selected panel.

2. The method according to claim 1, wherein the graphical tools of the third user selectable panel of the graphical user interface includes a tool with visual zoom functions for scaling display of specific regions displayed on the global map.

3. The method according to claim 2, wherein the graphical tool for rotation of the global map enables a user to select a specific speed of rotation.

4. The method according to claim 1, further comprising storing the global earth data and the global earth images in a computer readable data historical archive.

5. The method according to claim 1, wherein the third user selectable panel of the graphical user interface is configured to enable a user directed an animated sequence of global images.

6. The method according to claim 1, wherein said receiving of the global earth data includes automatically extracting the global earth data the multiple data sources including generated satellite data.

7. The method according to claim 6, wherein said automatically extracting of the global earth data is performed at predefined time intervals.

8. The method according to claim 1, wherein:
   the atmospheric data includes at least one of trace gas data, and aerosol data, surface temperature data;
   the hydrospheric data includes at least one of sea surface temperature data, and cloud data;
   the lithospheric data includes at least one of seismic data and volcanic data,
   the biospheric data includes at least one of vegetation data and chlorophyll data
   the cryospheric data includes at least one of snow data and ice data; and
   the anthrospheric data includes at least one of human population data, energy use data, and fire data.

9. One or more non-transitory computer readable media storing computer executable instructions that, when executed by at least one processor, cause the at least one processor to perform a method comprising:
   electronically receiving computer readable global earth datasets in a native format at regular daily intervals from multiple data sources accessed through secure protocols over the web, the global earth datasets including computer readable data representative of each of earth science observed data including atmospheric data, hydrospheric data, lithospheric data, cryospheric data, biospheric data, and anthrospheric data;
   electronically processing the global earth datasets based on different computer readable identifiers for the datasets;
   electronically generating digital global earth images with a computer processor, by executing computer readable code to process each individual global dataset, the global images being generated based on the received global earth datasets in their native format and converted, by executing computer readable code, into the global images for digital display and access by way of a graphical user interface; and
   displaying the graphical user interface on a computing device display screen and displaying a computer generated global map thereon; the graphical user interface having first, second, and third user selectable panels;
   the first user selectable panel being configured to display a first user selectable global image associated with a first global earth image representative of a first global earth dataset, and a second user selectable global image associated with a second global earth image representative of a second global earth dataset, the first user selectable panel being further configured to enable a user to select for superimposing the second global earth image over the first global earth image;

the second user selectable panel being configured to enable a user to select a date range from a period of time associated with the datasets;

the third user selectable panel being configured to display the computer generated map including a plurality of graphical tools for manipulating a size and rotation of the global map and display animated movement of the data on the global map; wherein responsive to the selection of the first, second or third user selectable panel of the graphical user interface, a user selectable tab portion of the two unselected panels are displayed above the selected panel.

10. The one or more non-transitory computer readable media according to claim 9, wherein the graphical user interface is configured to adjust a visual transparency the second global earth image.

11. The one or more non-transitory computer readable media according to claim 9, further comprising a step of storing the global earth data and the global earth images in a computer readable data historical archive.

12. The one or more non-transitory computer readable media method according to claim 9, wherein the third user selectable panel of the graphical user interface is configured to enable a user directed an animated sequence of global images.

13. The one or more non-transitory computer readable media according to claim 9, wherein said step of receiving of the global earth datasets is performed at predefined time intervals.

14. The one or more non-transitory computer readable media according to claim 9, wherein:
the atmospheric data includes at least one of trace gas data, and aerosol data, surface temperature data;
the hydrospheric data includes at least one of sea surface temperature data, and cloud data;
the lithospheric data includes at least one of seismic data and volcanic data,
the biospheric data includes at least one of vegetation data and chlorophyll data
the cryospheric data includes at least one of snow data and ice data; and
the anthrospheric data includes at least one of human population data, energy use data, and fire data.

15. A computer system comprising:
a data collector processor for electronically receiving computer readable global earth datasets in a native format at regular daily intervals from a multiple data sources accessed through secure protocols over the web, the global earth datasets including computer readable data representative of each of earth science observed data including atmospheric data, hydrospheric data, lithospheric data, cryospheric data, biospheric data, and anthrospheric data;

a display screen connected to a computer processor, the computer processor for electronically generating digital global earth images to process each individual global dataset, the global images being generated based on the received global earth datasets in their native format and converted, by executing computer readable code, into the global images for digital display and access by way of a graphical user interface on the display screen; and the display screen for displaying the graphical user interface and a computer generated global map thereon; the graphical user interface having first, second, and third user selectable panels;

the first user selectable panel being configured to display a first user selectable global image associated with a first global earth image representative of a first global earth dataset, and a second user selectable global image associated with a second global earth image representative of a second global earth dataset, the first user selectable panel being further configured to enable a user to select for superimposing the second global earth image over the first global earth image;

the second user selectable panel being configured to enable a user to select a date range from a period of time associated with the datasets;

the third user selectable panel being configured to display the computer generated global map including a plurality of graphical tools for manipulating a size and rotation of the global map and display animated movement of the data on the global map; wherein responsive to the selection of the first, second or third user selectable panel of the graphical user interface, a user selectable tab portion of the two unselected panels are displayed above the selected panel.

16. The computer system according to claim 15, wherein the graphical tools of the third user selectable panel of the graphical user interface includes a tool with visual zoom functions for scaling display of specific regions displayed on the global map.

17. The computer system according to claim 15, wherein the graphical tools of the third user selectable panel of the graphical user interface includes user selectable tools for orientation of the global map and adjustable rate of rotation of the global map.

18. The computer system according to claim 15, wherein the third user selectable panel of the graphical user interface is configured to enable a user directed an animated sequence of global images.

19. The computer system according to claim 15, wherein:
the atmospheric data includes at least one of trace gas data, and aerosol data, surface temperature data;
the hydrospheric data includes at least one of sea surface temperature data, and cloud data;
the lithospheric data includes at least one of seismic data and volcanic data,
the biospheric data includes at least one of vegetation data and chlorophyll data
the cryospheric data includes at least one of snow data and ice data; and
the anthrospheric data includes at least one of human population data, energy use data, and fire data.

* * * * *